(12) United States Patent
Kim et al.

(10) Patent No.: US 11,527,888 B2
(45) Date of Patent: Dec. 13, 2022

(54) POWER PLANT-CONNECTED ENERGY STORAGE SYSTEM AND METHOD OF CONTROLLING SAME

(71) Applicant: DOOSAN ENERBILITY CO., LTD., Changwon-si (KR)

(72) Inventors: Tae Hee Kim, Yongin-si (KR); Young Hoon Rhie, Yongin-si (KR); Ju Young Youn, Yongin-si (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 354 days.

(21) Appl. No.: 16/826,311

(22) Filed: Mar. 23, 2020

(65) Prior Publication Data
US 2020/0313431 A1 Oct. 1, 2020

(30) Foreign Application Priority Data

Apr. 1, 2019 (KR) .................. 10-2019-0037835
Apr. 1, 2019 (KR) .................. 10-2019-0037836

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| H02J 3/00 | (2006.01) |

(Continued)

(52) U.S. Cl.
CPC .............. H02J 3/001 (2020.01); G05B 15/02 (2013.01); H02J 7/007 (2013.01); H02J 7/0014 (2013.01)

(58) Field of Classification Search
CPC .......... H02J 3/001; H02J 7/0014; H02J 7/007; H02J 3/241; H02J 3/32; H02J 3/24; G05B 15/02
See application file for complete search history.

(56) References Cited

U.S. PATENT DOCUMENTS

| | | | |
|---|---|---|---|
| 2012/0139241 A1* | 6/2012 | Haj-Maharsi | ........... H02J 3/381 290/44 |
| 2014/0039710 A1* | 2/2014 | Carter | ...................... H02J 3/00 700/291 |

(Continued)

FOREIGN PATENT DOCUMENTS

| | | |
|---|---|---|
| JP | 2001-103679 A | 4/2001 |
| JP | 2011-234563 A | 11/2011 |

(Continued)

*Primary Examiner* — Zhipeng Wang
(74) *Attorney, Agent, or Firm* — Harvest IP Law LLP

(57) ABSTRACT

A power plant-connected energy storage system maintains frequency quality of power generated and supplied by a power plant. The system includes an electric energy storage unit that includes two or more batteries of different types and is configured to be charged or discharged to improve frequency quality of power output from the power plant; and a power conditioner configured to control of the power output from the power plant and to control charge and discharge at least one of the two or more batteries in accordance with the control of the power output from the power plant. The two or more batteries include a short cycle battery having a relatively short charge/discharge cycle and a long cycle battery having a relatively long charge/discharge cycle.

14 Claims, 12 Drawing Sheets

(51) Int. Cl.
*G05B 15/02* (2006.01)
*H02J 7/00* (2006.01)

(56) References Cited

U.S. PATENT DOCUMENTS

| | | | | |
|---|---|---|---|---|
| 2014/0042978 | A1* | 2/2014 | Nishibayashi | H02J 7/007 |
| | | | | 320/134 |
| 2015/0381089 | A1* | 12/2015 | Tarnowski | H02J 3/40 |
| | | | | 290/44 |
| 2016/0079776 | A1* | 3/2016 | Iguchi | B60L 53/22 |
| | | | | 320/134 |
| 2016/0359328 | A1* | 12/2016 | Hunt | H02J 7/022 |
| 2017/0063127 | A1* | 3/2017 | Shelton | H02J 7/00047 |
| 2017/0237260 | A1* | 8/2017 | Rhie | H02J 3/00 |
| | | | | 307/72 |

FOREIGN PATENT DOCUMENTS

| | | |
|---|---|---|
| KR | 2013-0070952 A | 6/2013 |
| KR | 2015-0037138 A | 4/2015 |
| KR | 10-1727060 B1 | 4/2017 |
| KR | 2017-0076129 A | 7/2017 |
| KR | 2017-0129456 A | 11/2017 |
| KR | 10-1824400 B1 | 1/2018 |
| KR | 2018-0047137 A | 5/2018 |
| KR | 2018-0106398 A | 10/2018 |
| KR | 100972279 B1 | 7/2020 |

* cited by examiner

POWER PLANT-CONNECTED ENERGY STORAGE SYSTEM AND METHOD OF CONTROLLING SAME

CROSS REFERENCE TO RELATED APPLICATION

The present application claims priority to Korean Patent Application No. 10-2019-0037835 filed Apr. 1, 2019 and Korean Patent Application No. 10-2019-0037836 filed Apr. 1, 2019, the entire contents of which is incorporated herein for all purposes by this reference.

BACKGROUND

Field of the Disclosure

The present disclosure relates to a frequency control system connected with an energy storage system (ESS) to maintain frequency quality of power generated by and supplied from a power plant. More specifically, the present disclosure relates to a system and method for controlling the frequency of power output from a power plant by using an energy storage system including a short-cycle battery and a long-cycle battery and to a system and method for supplying emergency power to a power plant when the power plant operates in an abnormal state due to a fault in the power plant.

Description of the Related Art

When power plants transmit power (e.g., AC electric power) to end users, the frequency of the power, which is subject to variations in frequency because of fluctuations in power demand, must be regulated to fall within a predetermined frequency range. This predetermined frequency range is referred to as the nominal frequency band. When the frequency is outside the nominal frequency band, various problems occur in demand-side devices. For this reason, various measures are usually taken to ensure that the frequency is within the nominal frequency band.

However, classic frequency control means provided in power plants have a negative effect of limiting the overall performance of the power plants, resulting in less than full capacity output. That is, the full performance of the power plants cannot be fully exploited. In addition, the classic power control means cannot provide a quick response at the time of an emergency event in which a quick frequency change is required. Therefore, in connection with power plant control, there is a need for advanced frequency control means that enables exploitation of the maximum performance (i.e., design capacity) of a power plant and can perform faster frequency control to improve frequency quality.

Existing power plants include those equipped with an emergency diesel generator (EDG) to cope with an event in which a power plant enters an abnormal operation state due to a detected fault. That is, power plants are equipped with a backup power supply means for supplying emergency power in the event of power outage or an abnormal operation state in which power production and transmission apparatuses cannot normally operate. The backup power supply means serves to enable the power plants to recover from the abnormal operation state quickly.

However, since a conventional emergency diesel generator (EDG) is not operated in a normal operation state of a power plant, it is difficult to determine whether the EDG will actually properly operate when emergency power is required. In the case where the emergency diesel generator fails to properly operate when emergency power is required, the power plant is likely to incur a serious loss and the entire system is likely to suffer a big trouble. Therefore, inspection of the emergency diesel generator is very important. However, the emergency diesel generator is a mechanical device whose inspection is a physically difficult task. Furthermore, inspection is costly since the emergency diesel generator is made up of many components.

SUMMARY

It is an objective of the present disclosure to provide a power plant-connected energy storage system that can be used in conjunction with, or can replace, an existing frequency control means that has been used in an existing power plant. Another objective of the present disclosure is to provide a method of controlling the energy storage system.

The system and method of the present disclosure use a technique of regulating power frequency when an abnormality occurs in frequency quality due to a change in power demand in a power system.

Further, the system and method of the present disclosure use a technique of applying an energy storage system including a short-cycle battery and a long-cycle battery in a process of regulating the frequency of power to improve the safety and stability of the entire system and to increase the service lives of the batteries.

Further, the system and method of the present disclosure use a technique of applying an energy storage system including a short-cycle battery and a long-cycle battery to adaptively regulate the frequency of power according to charge and discharge characteristics of each battery in the event of a change in power demand.

Further, the system and method of the present disclosure use a technique of applying an energy storage system so that even the reserve power that is set aside for frequency control in a conventional system can be supplied to an electric grid.

It is another objective of the present disclosure to provide an energy storage system, and method, capable of supplying emergency power when a power plant is in an abnormal operation state and of supplying reserve power for maintaining frequency quality of a power system when a power plant is in a normal operation state. In other words, the present disclosure proposes a power plant-connected energy storage system to replace a conventional emergency diesel generator.

The system and method of the present disclosure use a technique of applying an energy storage system including a short-cycle battery and a long-cycle battery when supplying emergency power or when supplying reserve power for frequency quality control, thereby enabling a variety of forms of power to be supplied according to power demand.

According to one aspect of the present disclosure, there is provided an energy storage system connected to a power plant. The energy storage system may include an electric energy storage unit that includes two or more batteries of different types and is configured to be charged or discharged to improve frequency quality of power output from the power plant; and a power conditioner configured to control of the power output from the power plant and to control charge and discharge at least one of the two or more batteries in accordance with the control of the power output from the power plant.

The two or more batteries may include a short cycle battery having a relatively short charge/discharge cycle and a long cycle battery having a relatively long charge/discharge cycle.

The power plant may supply a power amount to a load, and the power amount may include a first power amount output from the power plant, the first power amount being 95% to 105% of a maximum power amount of the power plant; and a second power amount output from at least one of the short cycle battery and the long cycle battery.

The electric energy storage unit may be further configured to output a power amount that is one of a baseline power output from the long cycle battery, a peak power output from the short cycle battery, or the sum of the baseline power and the peak power.

The short cycle battery and the long cycle battery may be configured to supply power to each other.

The power conditioner may be further configured to operate in conjunction with a power plant controller provided in the power plant, receive data from the power plant, and control a charge or discharge of the short cycle battery and the long cycle battery on the basis of the received data. The power conditioner may be further configured to control the charge or discharge of the short cycle battery among the batteries included in the electric energy storage unit when the power plant controller performs governor free control or automatic power generation control. When the power plant controller performs frequency control following the governor free control or the automatic power generation control, the power conditioner may be further configured to control the charge or discharge of the long cycle battery of the batteries included in the electric energy storage unit.

According to another aspect of the present disclosure, there is provided a method for controlling a power plant-connected energy storage system. The method may include controlling a power output from a power plant; receiving, by a power conditioner, data indicating a frequency state of the power output from the power plant; and maintaining, by the power conditioner, a frequency of the power output from the power plant within a preset range by charging or discharging two or more batteries of different types included in an electric energy storage unit in accordance with the control of the power output from the power plant. The two or more batteries may include a short cycle battery having a relatively short charge/discharge cycle and a long cycle battery having a relatively long charge/discharge cycle.

In the above control method, the maintaining of the frequency of the power within the preset range may be performed in a manner that the power conditioner performs control to charge or discharge the short cycle battery of the batteries included in the electric energy storage unit when the power plant controller performs governor free control or automatic power generation control, or in a manner that the power conditioner performs control to charge or discharge the long cycle battery of the batteries included in the electric energy storage unit when the power plant controller performs frequency control after performing the governor free control or the automatic power generation control.

According to another aspect of the present disclosure, there is provided an energy storage system connected to a power plant. The energy storage system may include an electric energy storage unit configured to be discharged to supply emergency power to a power plant; and a power conditioner configured to control charge or discharge of at least one battery included in the electric energy storage unit. When it is determined that the power plant needs to be supplied with external power, the power conditioner may be further configured to supply emergency power to the power plant by discharging the at least one battery included in the electric energy storage unit. The at least one battery may include a short cycle battery and a long cycle battery.

When it is determined that the power plant is in a normal operation state, the power conditioner may be further configured to charge or discharge the at least one battery included in the electric energy storage unit to maintain a frequency of power output from the power plant within a preset range.

The power plant may be equipped with an emergency diesel generator, and when it is determined that the power plant needs to be supplied with external power, the power conditioner may be further configured to discharge the at least one battery selected from among a short cycle battery and a long cycle battery included in the electric energy storage unit according to an operation state of the emergency diesel generator. In addition, the power conditioner may be further configured to monitor an amount of power output from the emergency diesel generator, and discharge at least one of the short cycle battery and the long cycle battery in the electric energy storage unit such that the sum of the power amount output from the emergency diesel generator and the power amount output from the electric energy storage unit is greater than or equal to a preset value.

The power plant may be determined to need to be supplied with external power in one of an event of power outage, an event of restarting the power plant, or an event of commissioning the power plant.

When the power plant is in the normal operation state, the power conditioner may be further configured to control charge or discharge of the batteries included in the electric storage unit in conjunction with a power plant controller provided in the power plant.

According to another aspect of the present disclosure, there is provided a method for controlling a power plant-connected energy storage system. The method may include (a) determining, by a power conditioner, an operation state of a power plant; and (b) performing, by the power conditioner, control such that emergency power is supplied to the power plant by discharging batteries included in an electric energy storage unit when it is determined that the power plant needs to be supplied with external power. The method may further include (c) charging or discharging, by the power conditioner, one or more batteries in the electric energy storage unit such that a frequency of power output from the power plant is maintained within a preset range when it is determined that the power plant is in a normal operation state. The power plant may be equipped with an emergency diesel generator, and when it is determined in the step (b) that the power plant needs to be supplied with external power, the power conditioner discharges at least one battery selected from among a short cycle battery and a long cycle battery included in the electric energy storage unit according to an operation state of the emergency diesel generator.

The present disclosure has an advantage of enabling faster and more efficient frequency control to maintain frequency quality than a frequency control means provided in a power plant.

In addition, according to the present disclosure, a power plant can be free from a limitation in an operating environment in which a conventional power plant needs to reserve the reserve power for frequency control, so that the maximum power amount that can be supplied to end users from a power plant can be increased. Therefore, profits of power generation and supply can be increased.

In addition, according to the present disclosure, due to the use of a short-cycle battery which is less risky and a long-cycle battery in combination, it is possible to greatly reduce the probability of a power plant accident (incident of failure).

In addition, according to the present disclosure, it is possible to maximize the service life of the short cycle battery and the long cycle battery, resulting in reduction in the maintenance cost of the power plant.

In addition, according to the present disclosure, a power plant can supply the required power amount both when the power plant is in normal operation and when the power plant is in abnormal operation only by equipping a power plant-connected energy storage system which can replace an existing emergency diesel generator during the emergency operation of the power plant.

In addition, according to the present disclosure, since batteries having higher stability and safety than an emergency diesel generator which is a mechanical structure are used, it is possible to reduce man hours, time, and cost for periodic inspection of frequency control means for a power plant. In addition, when a situation where emergency power is actually required comes, the reliability of the utilization of the frequency control means can be improved.

In addition, according to the present disclosure, since a short cycle battery and a long cycle battery are used in combination, it is possible to supply power in various forms according to operation states.

DETAILED DESCRIPTION OF THE DISCLOSURE

Figure 1:
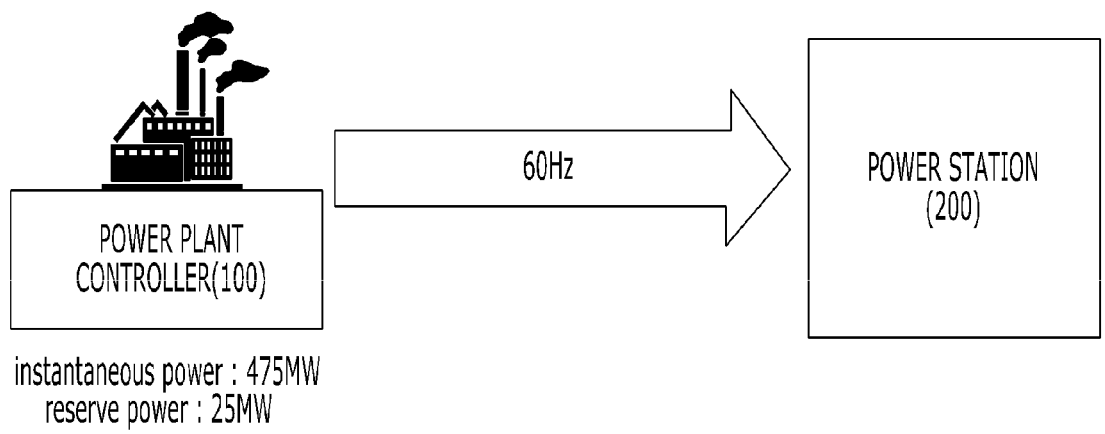
FIG. 1 is a diagram briefly illustrating transmission of electric power from a power plant to a power station according to an operation method of a conventional power plant.

Details of the objectives, technical configurations, and operational effects of the present disclosure will be clearly understood from the following detailed description and the accompanying drawings. Hereinafter, exemplary embodiments of the present disclosure will be described in detail with reference to the accompanying drawings.

The exemplary embodiments disclosed herein should not be interpreted or used as limiting to the scope of the invention. It will be apparent to those skilled in the art that the description including the exemplary embodiments provided herein has a variety of applications. Accordingly, exemplary embodiments are provided in the detailed description for illustrative purposes only and are not intended to limit the scope of the present disclosure.

Functional blocks shown in the drawings and described below are only examples of possible implementations. Other functional blocks can be used in other implementations without departing from the spirit and scope of the detailed description of the present disclosure. Although one or more functional blocks of the present disclosure are illustrated as separate blocks, one or more of the functional blocks of the present disclosure can be implemented as various hardware and software combinations that perform the corresponding functions.

It will be further understood that open-ended phrases such as "comprising", "including", "containing", "having", "characterized by" when used in this specification specify the presence of stated features, regions, integers, steps, operations, elements and/or components, but do not preclude the presence or addition of one or more other features, regions, integers, steps, operations, elements, components and/or groups thereof.

In addition, it will be understood that when any element is referred to as being "connected" or "coupled" to another element, one element may be directly connected or coupled to the other element, or an intervening element may be present therebetween.

Figure 2:
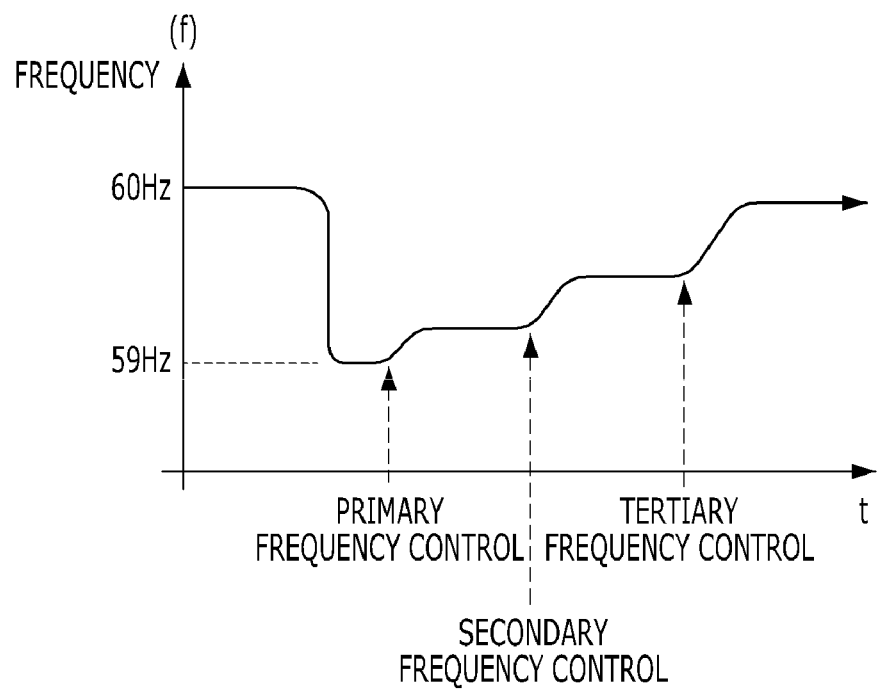
FIG. 2 is a graph illustrating frequency control methods applied in conventional power plants.

FIGS. 1 and 2 illustrate a frequency control method to maintain frequency quality during production and transmission of power in a conventional power plant, where FIG. 1 shows transmission of power from a power plant controller 1200 of a power plant to a power station 200 and FIG. 2 shows frequency control methods performed to maintain frequency quality in conventional power plants.

Referring to FIG. 1, electric power produced by a power plant (not shown) is transmitted to a power station 200 through a cable. The power plant is equipped with a power plant controller 100. Herein, "power plant" refers to a facility equipped with prime movers and various ancillary apparatuses for generating electricity. There are various types of power plants. For example, power plants can be classified into thermal power plants, nuclear power plants, hydro power plants, and renewable energy power plants according to energy resources used to generate electricity. The renewable energy power plants use renewable energy which comes from renewable resources such as sunlight, wind, tides, biomass, waves, and geothermal heat.

In certain countries, including the Republic of Korea, when electric power is transmitted to an electrical grid from a power plant through power lines, the electric power is transmitted at a frequency of 60 Hz. To this end, power plants are equipped with a power plant controller to regulate the frequency of electric power within a range of 59.2 Hz to 60.8 Hz. The power system frequency fluctuates according to power demand. Specifically, the frequency is affected by the supply of the active power and the demand of the active power. For example, when power demand surges, the frequency of the electric power system drops, and vice versa. To cope with the fluctuations in the frequency, a power plant is equipped with its own frequency control means.

The frequency control means provided in the power plant may control the power system frequency by adjusting the amount of power that is output. When power is generated and supplied by a power plant, the power plant is normally controlled such that the actual amount of power output from the power plant is below the maximum power amount (i.e., full capacity) that can be generated by the power plant. For example, in the case where the power plant shown in FIG. 1 is designed to have a rated capacity of 500 MW, the power plant controller 100 controls the operation of the power plant such that only 475 MW (instantaneous) power can be supplied to loads. The remaining 25 MW is reserve power to be used for control of the system frequency quality. In other words, when the frequency of the supply power is lowered, the 25 MW of reserve power is used to raise the frequency of power generation to 60 Hz. On the contrary, when the frequency of supply power is increased, the frequency of power generation is lowered. In this way, the frequency quality of the power system is maintained.

Referring to FIG. 2, a power plant may apply a method by which its frequency is adjusted when the frequency changes in order to improve frequency quality. When the frequency of supply power drops below 59 Hz, a conventional power plant itself performs at least two stages of frequency control. For example, the power plant performs primary frequency control corresponding to governor free (G/F) control and secondary frequency control corresponding to automatic power generation control. In general, when the frequency falls below a preset range, the power plant controller 100 performs the primary frequency control by itself. When the frequency does not recover to the normal range (preset range) through the primary frequency control, the secondary frequency control is performed. The primary and secondary frequency controls are performed by controlling operation of internal equipment in the power plant. That is, the operating speed of a turbine, the amount of steam, etc. are adjusted. In this case, the adjustment of output power is limited to 25 MW which is the amount of reserve power. Referring to FIG. 2, when the frequency recovery to the normal range is failed through the secondary frequency control, it is possible to secure the necessary power by operating a diesel generator or performing pumping-up power generation. This is called tertiary frequency control.

The system frequency control method performed in the conventional power plant, which is described with reference to FIGS. 1 and 2, has several problems. Among these, the biggest problem is that the cost of the frequency control is high. In other words, since the power plant cannot generate the amount of power which reaches the full capacity of the power plant, the business operator of the power plant suffers a profit loss. In addition, such an inefficient operation mode economically burdens governments or other entities with the necessity of constructing more power plants than expected to meet the power demand in the country.

According to the present disclosure, the power plant controller 100 for operating the power plant is connected to an energy storage system 300 so that the power system frequency can be controlled by using the energy stored in a battery. Hereinafter, an energy storage system will first be briefly outlined with reference to FIG. 3.

With the development of industry, the demand for electricity continues to increase while resources for producing electricity are decreasing toward the depleted state. Recently, systems for efficiently managing production and demand of electricity have been studied. An energy storage system is an example of the systems for managing production and demand of electricity. In order to eliminate waste of energy and inconvenience to consumers caused by imbalance between power production and power demand, research on energy storage systems has been actively conducted to provide an environment in which production and consumption of electricity can be well planned.

An energy storage system refers to a system that stores electrical energy (electric power) generated from an energy source and makes it available when needed. The basic components of the energy storage system include an electric energy storage unit for storing electric energy and a power conditioner 301 for controlling charging or discharging of the electric energy storage unit. The energy storage system may further include a battery management unit 305 and an energy management unit (not shown). The components of the energy storage system will be described in more detail below.

Figure 3:
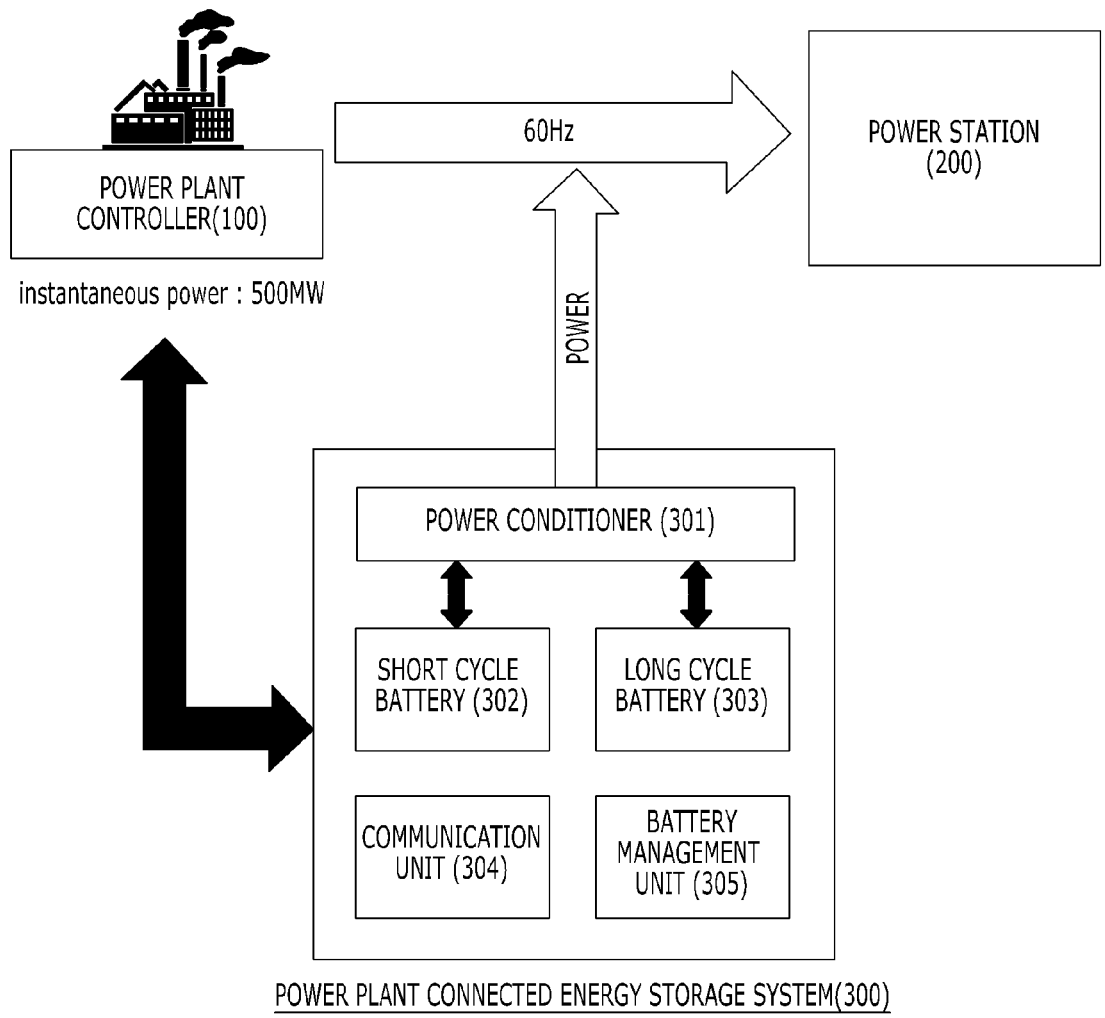
FIG. 3 is a block diagram of a power plant connected energy storage system according to a first embodiment of the present disclosure.

FIG. 3 illustrates a power plant-connected energy storage system 300 according to the present disclosure. According to FIG. 3, the energy storage system 300 includes an electric energy storage unit (described below) and a power conditioner 301 as core components, and further includes a communication unit 304 for communication with the power plant controller 100 and a battery management unit 305 for managing each battery provided in the electric energy storage unit as auxiliary components.

First, the electric energy storage unit includes two or more batteries that can be charged and discharged to adjust the power frequency of the power plant (i.e., system frequency). For example, the two or more batteries may include a short cycle battery 302 and a long cycle battery 303. More particularly, the electric energy storage unit may be composed of one set of plural batteries each with a relatively short charge-and-discharge cycle and another set of plural batteries each with a relatively long charge-and-discharge cycle. Examples of the battery used in the present disclosure may include various batteries such as a flow battery, a secondary battery, a flywheel, a NAS, and a solid-state battery. In addition, an example of the short cycle battery 302 is a lithium ion battery (LiB), and an example of the long cycle battery 303 is a vanadium redox flow battery. However, the short cycle battery 302 and the long cycle battery 303 are not limited to these batteries. Any combination of batteries that differ in length of a charge/discharge cycle can be used as the short cycle battery and the long cycle battery.

Next, the power conditioner 301 is a so-called power converter. The power conditioner 301 basically serves to control the charge and discharge of the batteries in the electric energy storage unit. Specifically, the power conditioner 301 performs AC-to-DC conversion or DC-to-AC conversion or transforms voltage, current, or frequency of electric power. The power conditioner 301 transfers the energy supplied from a power plant to loads through an electrical grid or to a battery so as to be stored in the battery through a battery charging process. Charge and discharge of the battery are performed in accordance with the types and characteristics of the battery. In particular, the power conditioner 301 of the energy storage system 300 may be linked to the power plant controller 100 which controls facilities (for example, turbines) used to control the output power of the power plant, which configuration is indicated by the term "power plant-connected energy storage system." Thus, the power conditioner 301 receives data from the power plant controller 100 and controls the charge and discharge of the short cycle battery 302 and the long cycle battery 303 according to the received data. The data that is transmitted from the power plant controller 100 to the power conditioner 301 includes data that indicates a real-time operation state of the power plant. For example, the data may include real-time values of the system frequency that fluctuates, operating amounts (for example, turbine speed, steam amount, etc.) of equipment in the power plant, and real-time instantaneous power of the power plant.

In addition to the above-described key components the energy storage system 300, the energy storage system 300 of the present disclosure may further include the communication unit 304 and the battery management unit 305.

The communication unit 304 is responsible for transmission and reception of data to and from the power plant controller 100 so that the power plant-connected energy storage system 300 can operate in conjunction with the power plant controller 100. The presence or absence of the communication unit 304 in the power plant-connected energy storage system 300 may be determined according to whether the power plant controller 100 and the power plant connected energy storage system 300 are implemented independently of each other or implemented as a single system. In the present embodiment, the power plant-connected energy storage system 300 and the power plant controller 100 are configured independently of each other, and the communication 304 is present in the energy storage system 300. However, in the case an integrated design in which the power plant-connected energy storage system 300 and the power plant controller 100 are integrated, the communication unit 304 is not necessary.

The battery management unit 305 is configured to sense the voltage, current, temperature, etc. of the battery and to control the charge and discharge level of the battery. The battery management unit 305 also performs the cell balancing of the battery and monitors the state of charge (remaining charge level) of the battery. In addition, the battery management unit 305 protects the battery by performing an emergency operation when a dangerous situation occurs. The battery manager 305 and the power conditioner 301 perform different functions but are common in that they both control the battery. Depending on design, the power conditioner 301 and the battery management unit 305 may be implemented as a single server.

Figure 4:
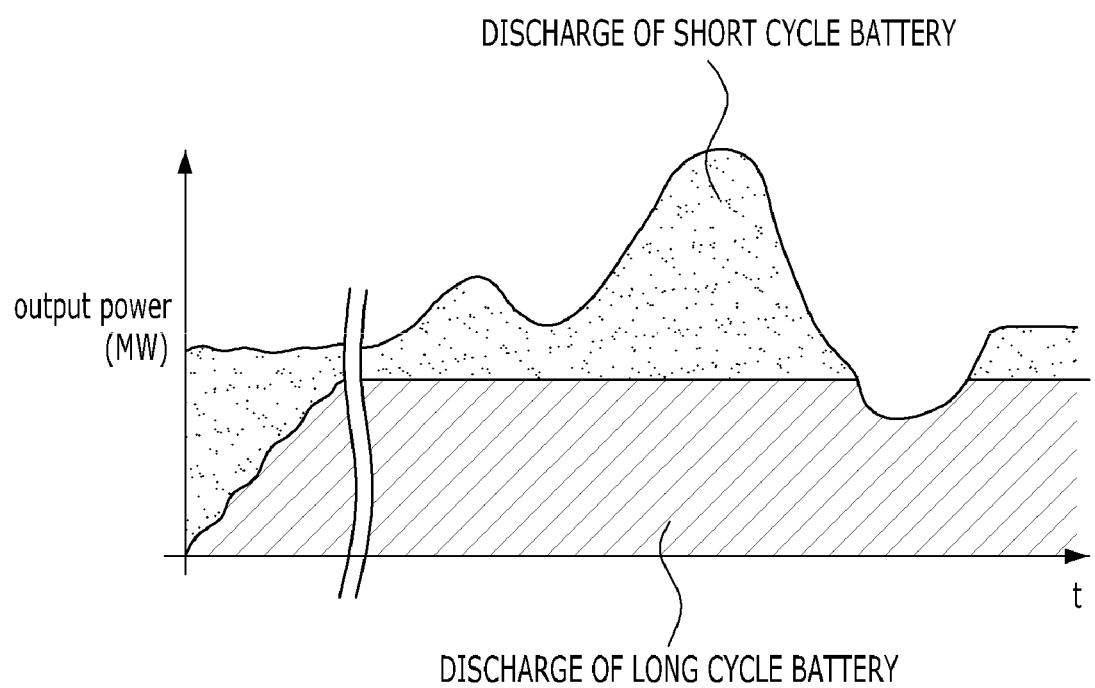
FIG. 4 is a graph illustrating an example of charge and discharge of a short cycle battery and a long cycle battery when a frequency change occurs due to a change in power demand in an electric power system.

FIG. 4 illustrates one example embodiment in which the frequency quality of the system is maintained by using the power plant-connected energy storage system 300 according to the present disclosure. Specifically, it is shown that the state of charge of each of the short cycle battery 302 and the long cycle battery 303 changes with time.

In the embodiment of FIG. 4, an operating period is divided into a first period and a second period. The first period of FIG. 4 occupies the earlier portion of the graph (left side) and the second period occupies the later portion (right side), with the separation between the two portion occurring in the x-axis break in the graph. The first period lasts until the instantaneous power reaches a predetermined level after the power plant starts operating, and the second period continues while the predetermined level of the instantaneous power is maintained and the charge or discharge of the long cycle battery 303 and the short cycle battery 302 is performed due to frequency change according to demand change at a load side.

The embodiment of FIG. 4 is based on the premise that the power plant outputs the maximum amount of instantaneous power that can be supplied to the load side. For example, in the case where the capacity of the power plant is 500 MW, it is assumed that 500 MW of instantaneous power is output from the power plant without remaining power (i.e., reserve power) to be used for frequency quality control.

Specifically, t automatic power generation control the first period of the operating period is a time duration which is necessary taken until the output power reaches a predetermined level of instantaneous power after the power plant starts operating. During this period, the short cycle battery 302 and the long cycle battery 303 in the power plant-connected energy storage system 300 are discharged so that the steady system frequency can be maintained until a predetermined level of instantaneous power is reached after the starting of the operation of the power plant. In this case, in order to quickly stabilize the quality of power supplied from the power plant to the load side, the discharge amount of the short cycle battery 302 is adjusted to be higher than that of the long cycle battery 303 which takes a relatively long time to discharge. Therefore, stable instantaneous power can be supplied to the load side in a short period of time, thereby reducing a time duration during which the power of low quality is supplied to the load side. In FIG. 4, the instantaneous power amount output from the power plant-connected energy storage system 300 and the instantaneous power amount output from the power plant itself are not separated. However, it is noted that the power amount is the sum of the power amount output from the power plant, the power amount output from the long cycle battery, and the power amount output from the short cycle battery 302. In the detailed description of the present disclosure, the instantaneous power amount output from the power plant is referred to as a first power amount, and the instantaneous power amount output from the long cycle battery 303 or the short cycle battery 302 is referred to as a second power amount.

Next, during the second period of the operating period, the frequency fluctuates according to the power demand at the load side. When the frequency becomes outside a preset range, the frequency is quickly adjusted to fall within the present range by using batteries with different charge/discharge cycles. Referring to FIG. 4, the frequency fluctuation may vary depending on the power demand. Specifically, it is shown that the frequency fluctuation rapidly changes when the power demand is above a certain reference value. In one embodiment, the baseline power amount is supplied through the discharge of the long cycle battery 303, and the frequency adjustment is performed by discharging the short cycle battery 302 when the frequency fluctuation is relatively rapid and sharp. That is, in FIG. 4, the discharge amount of the long cycle battery 303 does not change with time. That is, the reference value (baseline power) is maintained. In order to increase the power amount above the baseline power, the short cycle battery 302 that performs fast charging and discharging is used to cope with a rapid fluctuation.

Figure 5:
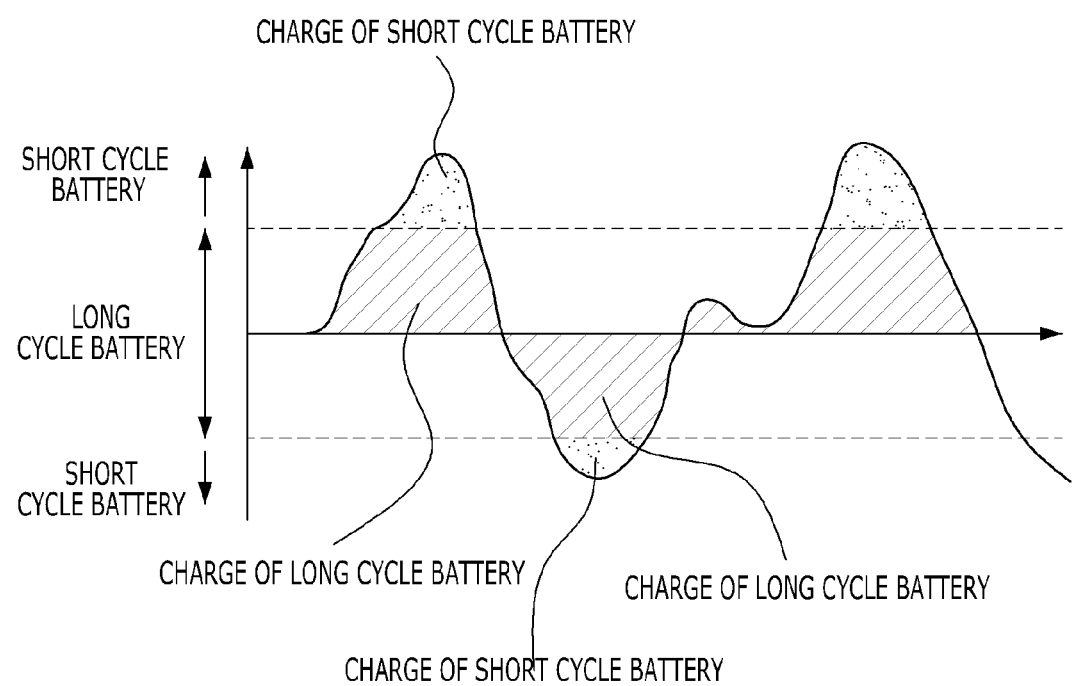
FIG. 5 is a graph illustrating another example of charge and discharge of a short cycle battery and a long cycle battery.

FIG. 5 illustrates another embodiment of maintaining the frequency quality of the system using the power plant-connected energy storage system 300.

Unlike the embodiment of FIG. 4, the embodiment of FIG. 5 is based on the premise that a period in which the long cycle battery 303 is charged/discharged and a period in which the short cycle battery 302 is charged/discharged are separated. For example, when the instantaneous power output from the power plant is 500 MW and the frequency of the power changes because the power demand fluctuates between 450 MW and 550 MW, the frequency control for the frequency variation caused by the fluctuation of power demand in the range of 470 MW to 530 MW is performed by charging or discharging the long cycle battery 303, and frequency control for the frequency variation caused by the fluctuation of power demand that is outside the range of 470 MW and 530 MW is performed by charging or discharging the short cycle battery 302. It is noted that the above numerical range is only for helping understanding of the present disclosure and the scope of the present disclosure is not limited to that range.

As shown in the embodiments of FIGS. 4 and 5, a total supply power is equal to the sum of the power (first power) generated and supplied by the power plant and the power (second power) output from the long cycle battery 303 and the short cycle 302 when the power plant-connected energy storage system 300 is used. Therefore, frequency in the system can be easily maintained within a preset range.

Power plants typically operate with a certain margin with respect to the maximum power amount (e.g., full capacity) of the power plant for the sake of safety and stability when supplying instantaneous power. Considering such a margin, the embodiment is based on the premise that the power plant outputs instantaneous power within a range of 95% to 105% of the maximum power amount that can be output from the power plant. According to the embodiments, the power amount supplied to the load is equal to the sum of the first power that is output from the power plant and the second power that is output from the power plant-connected energy storage system 300.

In addition, as demonstrated in the above embodiments, the long cycle battery 303 and the short cycle battery 302 do not necessarily have to be charged or discharged at the same time. That is, either one of the batteries 302 and 303 may be charged or discharged without charging or discharging the other.

On the other hand, the short cycle battery 302 and the long cycle battery 303 included in the electric energy storage unit are configured to supply power to each other. That is, since the short cycle battery 302 and the long cycle battery 303 are different from each other in charge and discharge time and in the amount of charge and discharge, the amount of electric energy stored in either one of the short cycle battery 302 and the long cycle battery 303 may be smaller than that stored in the other. Since exchange of electrical energy between the two different types of batteries is possible, the amount of electrical energy stored in the batteries can be balanced.

While the foregoing description focuses on maintaining the system frequency quality in real time according to the power demand fluctuating in real time, the power plant-connected energy storage system 300 (i.e., the power conditioner 301) may set the charge/discharge schedule of each of the short cycle battery 302 and the long cycle battery 303 by predicting the amount of power demand of the load in advance. This is particularly helpful in utilizing the long cycle battery 303. When charging and discharging the long cycle battery 303, which requires a relatively long time for charging and discharging, according to the schedule that is set on the basis of past power demand data, it is possible to appropriately respond to the power demand that is predicted. Therefore, it is possible to efficiently maintain the frequency stability. Furthermore, since the charging/discharging schedule of the short cycle battery 302 is also determined according to the accumulated power demand data, the short cycle battery 302 may appropriately cope with the fluctuation of the power demand. This is only one embodiment. It will be understood that the power conditioner 301 can determine the charge and discharge schedule only for the long cycle battery 303 on the basis of the past power demand data and can control charging and discharging of the short cycle battery 302 according to real-time power demand that fluctuates in real time.

Figure 6:
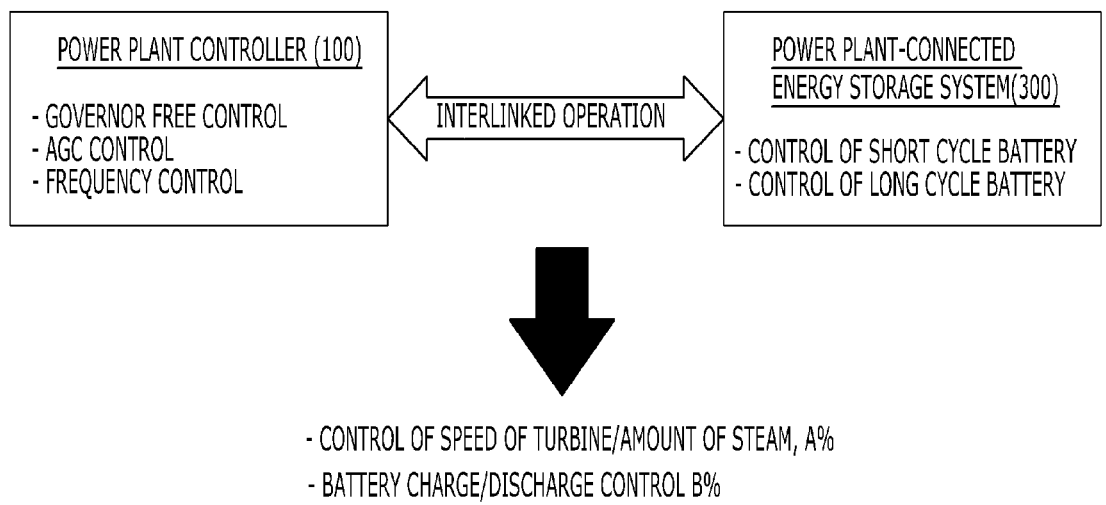
FIG. 6 is a diagram illustrating a method for controlling output power of a power plant in a manner that a controller of a power plant and an energy storage system connected to the power plant operate in conjunction with each other.

FIG. 6 illustrates a state in which the power plant controller 100 and the power plant-connected energy storage system 300 operate in conjunction with each other to improve the system frequency quality. In the embodiments shown in FIGS. 4 and 5, the frequency control is performed by using the power output from the long cycle battery 303 and the short cycle battery 302 on the premise that the power plant supplies the maximum instantaneous power excluding the margin. In the embodiment of FIG. 6, the power plant controller 100 and the energy storage system may perform frequency control in conjunction with each other.

In this case, the power plant controller 100 may perform primary frequency control (called governor free or G/F control) when the frequency is out of the preset range due to fluctuations in demand in the system. At this time, the storage system 300 may control charging and discharging of the short cycle battery 302 and the long cycle battery 303 to contribute to frequency control in conjunction with the power plant controller 100. In addition, when the system frequency is still not maintained within the proper range despite the primary frequency control, the power plant controller 100 and the power plant-connected energy storage system 300 may perform, in parallel, the secondary frequency control (AGC control) and changing and discharging of the short cycle battery 302 and the long cycle battery 303 so that the system frequency can be maintained within an appropriate range.

As such, when the power plant controller 100 and the power plant-connected energy storage system 300 operate in conjunction with each other to perform frequency control, at least one of the controller 100 or the system 300 may calculate at which ratio a primary frequency control, a secondary frequency control, and charging and discharging of the short cycle battery 302 and the long cycle battery 303 will be performed. The calculation result is shared. Thus, at least one of the frequency control of the power plant or the battery charging and discharging may be performed. For example, as shown in FIG. 6, at least one of the power plant controller 100 and the energy storage system 300 performs turbine speed/steam volume control and battery charge/discharge at a ratio of A %:B %, thereby meeting the output power amount to control the frequency changing in real time.

Figure 7:
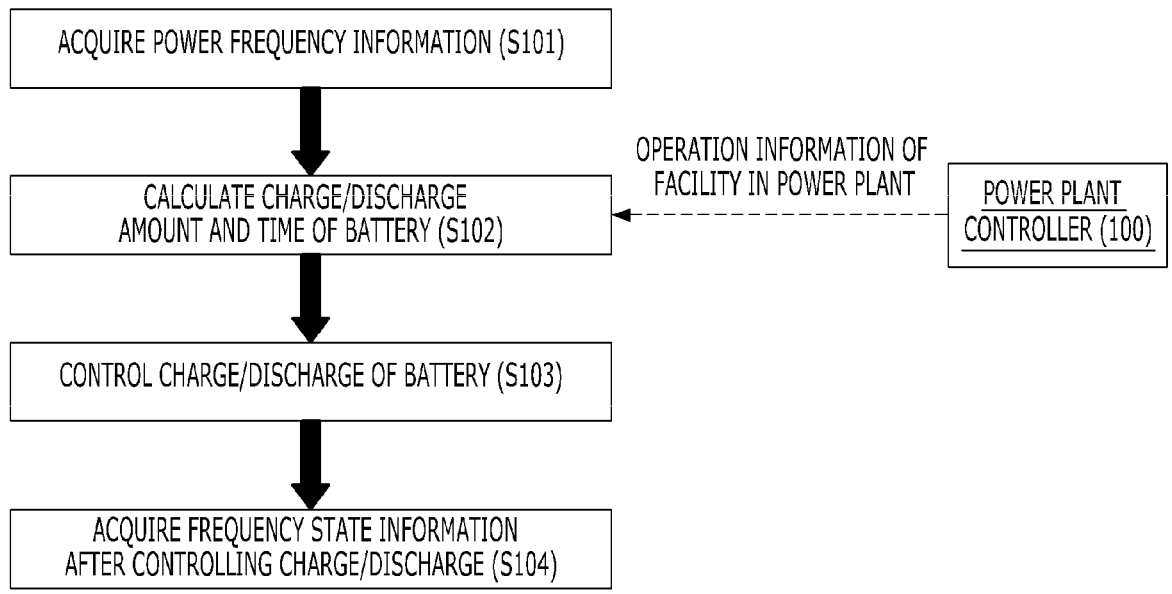
FIG. 7 is a flowchart of a method for controlling the power plant connected energy storage system according to the first embodiment of the present disclosure.

FIG. 7 illustrates a method for controlling a power plant-connected energy storage system according to the present disclosure.

Referring to FIG. 7, a power conditioner of a power plant-connected energy storage system, such as the power conditioner 301 of the system 300 of FIG. 3, obtains information on a frequency state of power output from a power plant. That is, the control method begins with acquiring the power frequency information (S101) by receiving the power frequency information or by directly monitoring the power frequency. In order to control the quality of a system frequency, it is first necessary to determine the frequency of the power currently being supplied. When the power plant-connected energy storage system is equipped with a frequency monitoring means, the data produced by the monitoring means is directly used. However, when there is no frequency monitoring means, data received from the power plant may be used.

After acquiring information on the current system frequency state, the power conditioner may calculate how much charge/discharge is required or how much power is charged/discharged for a predetermined period of time, according to the frequency state (S102). In this step, when the power plant-connected energy storage system is operated alone, the calculation may be performed on the basis of the charge/discharge capacity of a long cycle battery and a short cycle battery. When information on facilities in the power plant can be received from the power plant controller, the operation amounts of the facilities are also considered in the calculation. That is, the power conditioner may calculate the charge/discharge amount and the charge/discharge time of each battery on the basis of the information that is shared between the power conditioner and the power plant controller.

After the calculation, the power conditioner may control the charge/discharge of the long cycle battery and the short cycle battery (S103). After the control, the power conditioner may obtain result information on whether the system frequency is maintained within an appropriate range (S104). At this time, in the step of acquiring the result information, the monitoring means provided in the power plant-connected energy storage system acquires the information or performs a step in which the power conditioner receives the information from the power plant controller.

Hereinabove, the power plant-connected energy storage system according to the first embodiment of the present disclosure, and the method for controlling the power plant-connected energy storage system, have been described with reference to FIGS. 1 to 7.

Hereinafter, a power plant-connected energy storage system and a control method according to other exemplary embodiments will be described with reference to FIGS. 8 to 12.

Figure 8:
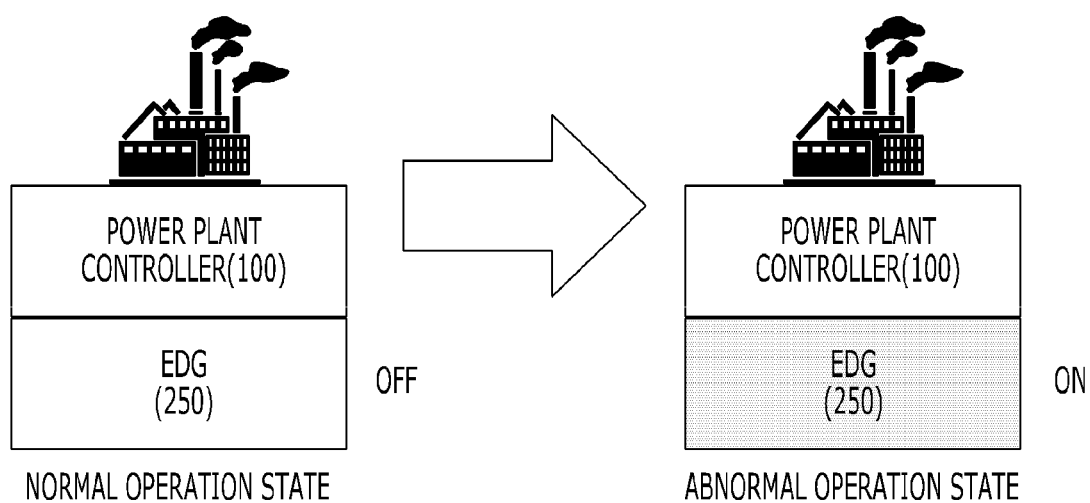
FIG. 8 is a diagram briefly illustrating operational states of a conventional power plant equipped with an emergency diesel generator.

FIG. 8 illustrates a configuration in which an emergency diesel generator 250 is provided in a power plant. The emergency diesel generator 250 is in an off state when the power plant is in a normal operation state. However, in an abnormal operation state of the power plant, the emergency diesel generator 250 is activated to provide the necessary emergency power to the power plant, i.e., the power plant controller 110. In this case, the power plant controller 100 collectively refers to a configuration for controlling various facilities (turbine, air vent, etc.) in the power plant. Although only the power plant controller 100 is illustrated in the drawings, it can be understood that power can be supplied to each of the facilities in the power plant through the operation of the emergency diesel generator 250.

On the other hand, a conventional emergency diesel generator 250 has a problem that it is difficult to determine whether the operation is actually performed properly because it is not operated in a normal operation state of a power plant. When the emergency diesel generator does not operate in the event in which emergency power is required, the power plant is greatly damaged and troubles occur throughout the whole power system. Therefore, inspection of the emergency diesel generator 250 is very important. However, the emergency diesel generator 250 is a mechanical device whose inspection is a physically difficult task. Furthermore, inspection is costly since the emergency diesel generator 250 is made up of many components.

A power plant-connected energy storage system that can replace the conventional emergency diesel generator 250 will now be described.

Figure 9:
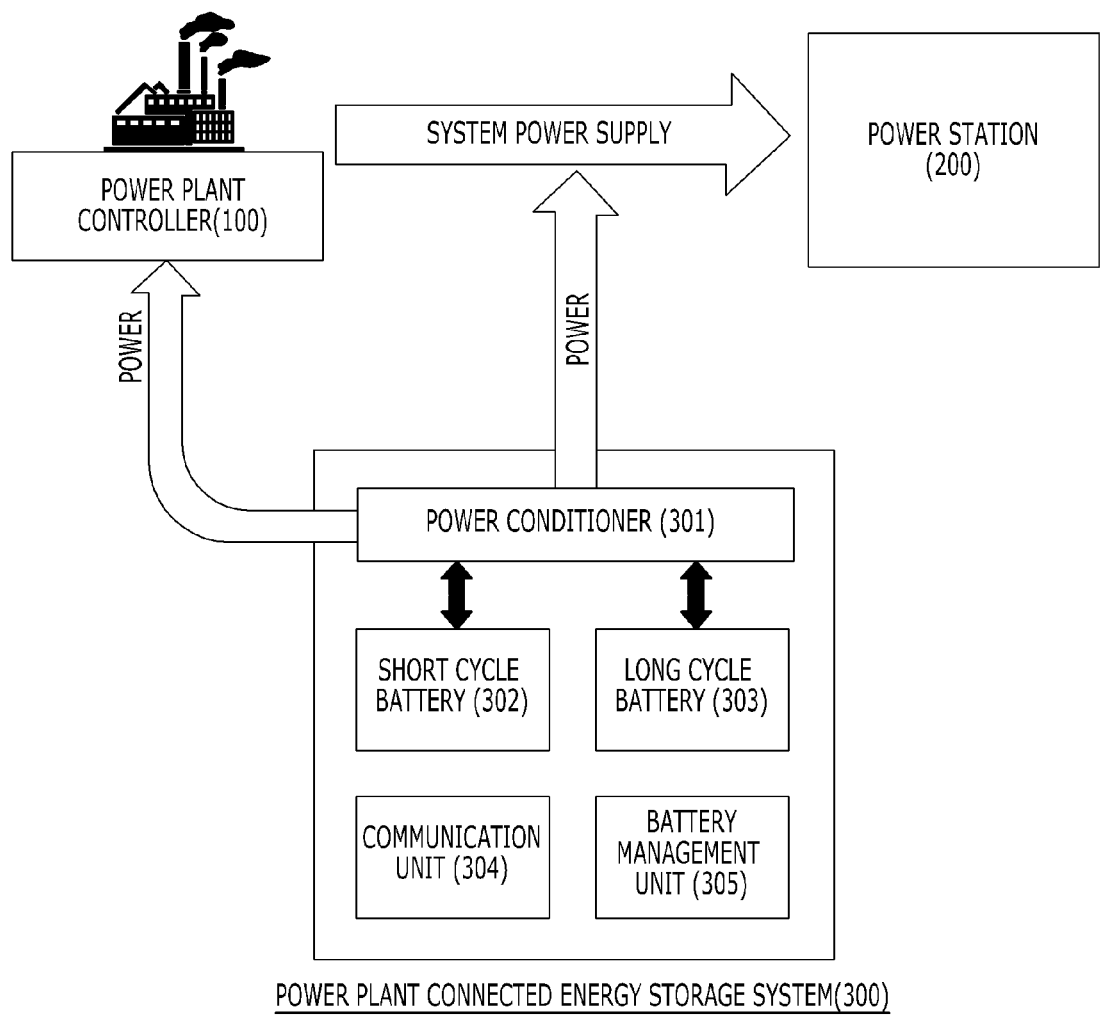
FIG. 9 is a block diagram of a power plant equipped with a multi-purpose power plant connected energy storage system according to a second embodiment of the present disclosure.

FIG. 9 illustrates a power plant-connected energy storage system 300 according to a second embodiment of the present disclosure. The core components of this power plant-connected energy storage system are the same as those of the system illustrated in FIG. 3. Therefore, only differences between the systems will be described.

An electric energy storage unit in the second embodiment is composed of a short cycle battery 302 and a long cycle battery 303. The energy storage unit functions to supply power for maintaining system frequency quality to a power plant and to supply emergency to the power plant by being discharged when the power plant is in an abnormal state in which, for example, the power plant needs to be supplied with external power.

In addition, a power conditioner 301 in the second embodiment is also substantially the same as that of the embodiment of FIG. 3. However, the power conditioner 301 in the second embodiment determines whether the power plant is in a normal operation state or an abnormal operation state on the basis of data received from a power plant controller 100. The received data may include system frequency changing in real time, operation amounts of facilities in the power plant (for example, speed of turbine, amount of steam, etc.), and real-time instantaneous power output from the power plant. That is, the data is information indicating a current operation state of the power plant. For example, the case where the operation amount of any facility in the power plant falls below a preset value, or the case where the real-time instantaneous power amount of the power plant falls below a preset value is determined as an abnormal operation state. The other cases are determined as a normal operation state.

As shown in FIG. 9, the power plant in the second embodiment is not equipped with the emergency diesel generator 250. As mentioned earlier, the power plant-connected energy storage system according to the present disclosure is intended to replace the emergency diesel generator 250, which is a conventional mechanical structure. According to the present embodiment, when it is necessary to supply emergency power to the power plant, the necessary power is supplied to the power plant through the discharge of a battery. Therefore, the emergency diesel generator 250 is not provided in the power plant in the embodiment of FIG. 9.

As further shown in FIG. 9, the power plant-connected energy storage system according to the second embodiment may directly supply power to the power plant controller 100, and may also supply (augment) power to the grid power that is supplied from a power plant to a substation. These two power transmission paths are indicted by two arrows extending from the power conditioner. That is, the multi-purpose power plant-connected energy storage system according to the present disclosure supplies power to the output side of the power plant to maintain the quality of the grid power when the power plant is in a normal operation state, and directly supplies power to the power plant (i.e., power plant controller 100) when the power plant is in an abnormal operation state.

Hereinafter, operation methods of the power plant-connected energy storage system according to the second embodiment operates will be described for two cases: supplying power to control the frequency quality of the system in a normal operation state of the power plant; and supplying emergency power to the power plant in an abnormal operation state of the power plant.

First, an embodiment in which the frequency quality is controlled by keeping the frequency of the system within a predetermined range when the power plant is operating normally is substantially the same as the power plant-connected energy storage system according to the first embodiment. Therefore, the detailed description of the present embodiment will be omitted. That is, the power plant-connected energy storage system according to the second embodiment is controlled to supply power for the frequency quality control of the system when the power plant normally operates. Since, the case has been described with reference to FIGS. 4 and 5, no further detailed description thereof will be given.

Figure 10:
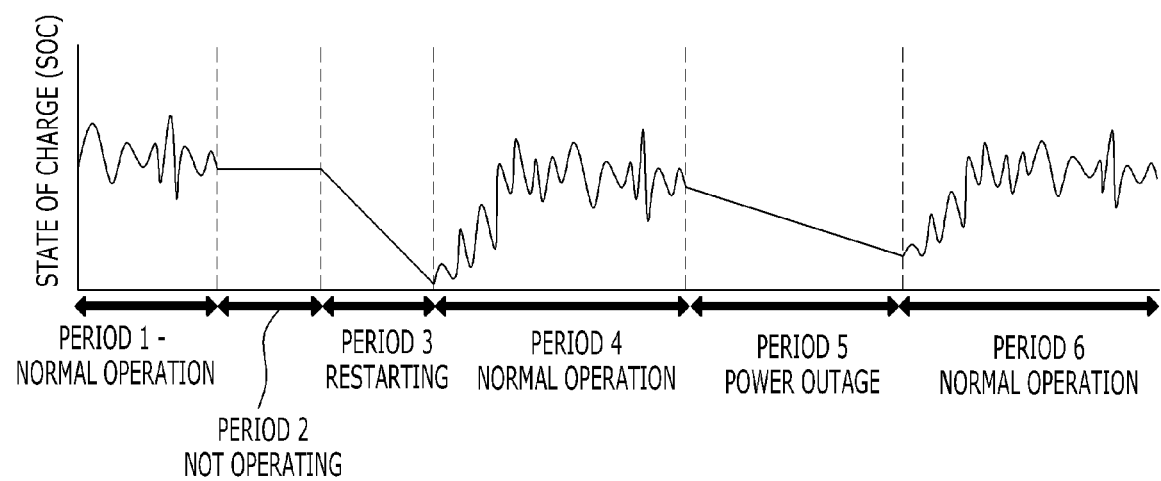
FIG. 10 is a graph illustrating the supply of emergency power to a power plant connected energy storage system when the power plant is in an abnormal operation state.

FIG. 10 illustrates a second purpose of the power plant-connected energy storage system according to the second embodiment. This is, FIG. 10 illustrates an embodiment in which emergency power is supplied to the power plant when the power plant is in an abnormal operation state.

In FIG. 10, the horizontal (x) axis of the graph indicates a change in the operation state of the power plant over time, and the vertical (y) axis of the graph indicates the state of charge of the battery of the electric energy storage unit in the multipurpose power plant-connected energy storage system. Here, the state of charge of the battery in each of Period 1 through Period 6 is shown, including Period 1 in which the power plant normally operates after starting, Period 2 in which the power plant is shut down, and Period 3 in which the power plant is restarted.

When the power plant normally operates, as described above with reference to FIGS. 4 and 5, the state of charge changes with demand fluctuations in the system. Next, when the power plant is shut down for a regular inspection of the power plant or for a certain reason, the power plant-connected energy storage system is controlled not to supply power to the power plant unless there is a specific reason. That is, the power plant-connected energy storage system may share information about the operation state of the power plant with the power plant controller 100. In the case of arbitrarily stopping the power plant, the power plant controller 100 may transmit to the power plant-connected energy storage system a control signal instructing not to supply power to the power plant. In this case, the power plant-connected energy storage system does not determine the current operation state as an abnormal operation state on the basis of the control signal and remain in a standby mode. On the other hand, in the period in which the power plant is restarted after the inspection of the power plant is finished, the power plant-connected energy storage system feeds the power stored in the battery to the power plant so that the power plant can be restarted. That is, the power plant-connected energy storage system according to the second embodiment may be configured to supply the power stored in the electric energy storage unit to the power plant after receiving information indicating that the power plant is in an abnormal operation state from the power plant controller 100. The abnormal operation state of the power plant may be defined when designing the power plant-connected energy storage system. Examples of the abnormal operation state are not limited to a power failure and an equipment failure in the power plant. In addition, the current operation state of the power plant is determined by the power plant-connected energy storage system on the basis of the control signal received from the power plant controller 100, data on the power plant operation status, or other monitoring results received from other means capable of monitoring the operation state of the power plant. That is, the basis for the determination of the operation state of the power plant is not limited to the control signal.

In the present example, when the power plant is restarted, a considerable amount of power is initially required. This is because a great deal of power is required to start preheaters, pumps, and turbines (rotors). In particular, when the turbines (rotors) are restarted, an electric motor is used to generate torque. At this time, the power from the emergency diesel generator 250 may be used. However, according to the present disclosure, the rotors are powered by the battery when the rotors are restarted.

Referring further to FIG. 10, when the power plant maintains its normal operation state after being restarted (Period 4), the battery charge amount (i.e., state of charge) is the same as that in the embodiments of FIGS. 4 and 5. In Period 5 in which a large scale blackout (power outage) occurs, the charge amount of the battery charge of the electric energy storage unit is reduced. This means that the emergency power is supplied to the power plant side from the battery of the electric energy storage unit. In the event of a large scale blackout, the power plant-connected energy storage system may determine that the power plant is abnormally operated, and this determination may be based on the control signal received from the power plant controller 100, data on the power plant operation status, and/or the monitoring results received from other means capable of monitoring the operation state of the power plant.

The electric energy storage unit in the power plant-connected energy storage system is charged or discharged such that the state of charge is maintained above a reference amount (for example, 50%) at normal times. The charge amount within a predetermined margin from the reference amount is referred to a control region, the lower charge amount than the control region is referred to as an overdischarge region, and the higher charge amount than the control region is referred to as an overcharge region. That is, the power plant-connected energy storage system may supply the remaining battery charge to the power plant in the abnormal operation state as described above under the assumption that the battery charge is maintained within the control region.

In addition, since the electric energy storage unit includes a short cycle battery 302 and a long cycle battery 303, it is possible to supply power to the power plant by discharging only either one of the short cycle battery 302 and the long cycle battery 303 according to the operation state of the power plant. That is, when the power plant is abnormally operating, the abnormal operation state may appear in various forms. For example, when a sudden power drop occurs, only the short cycle battery 302 is discharged, or the discharge amount of the short cycle battery 302 is increased compared to that of the long cycle battery. On the other hand, when the power drop occurs slowly, only the long cycle battery 303 is discharged or the discharge amount of the long cycle battery 303 is increased compared to that of the short cycle battery. In this way, it is possible to cope with various forms of abnormal operation of the power plant.

Figure 11:
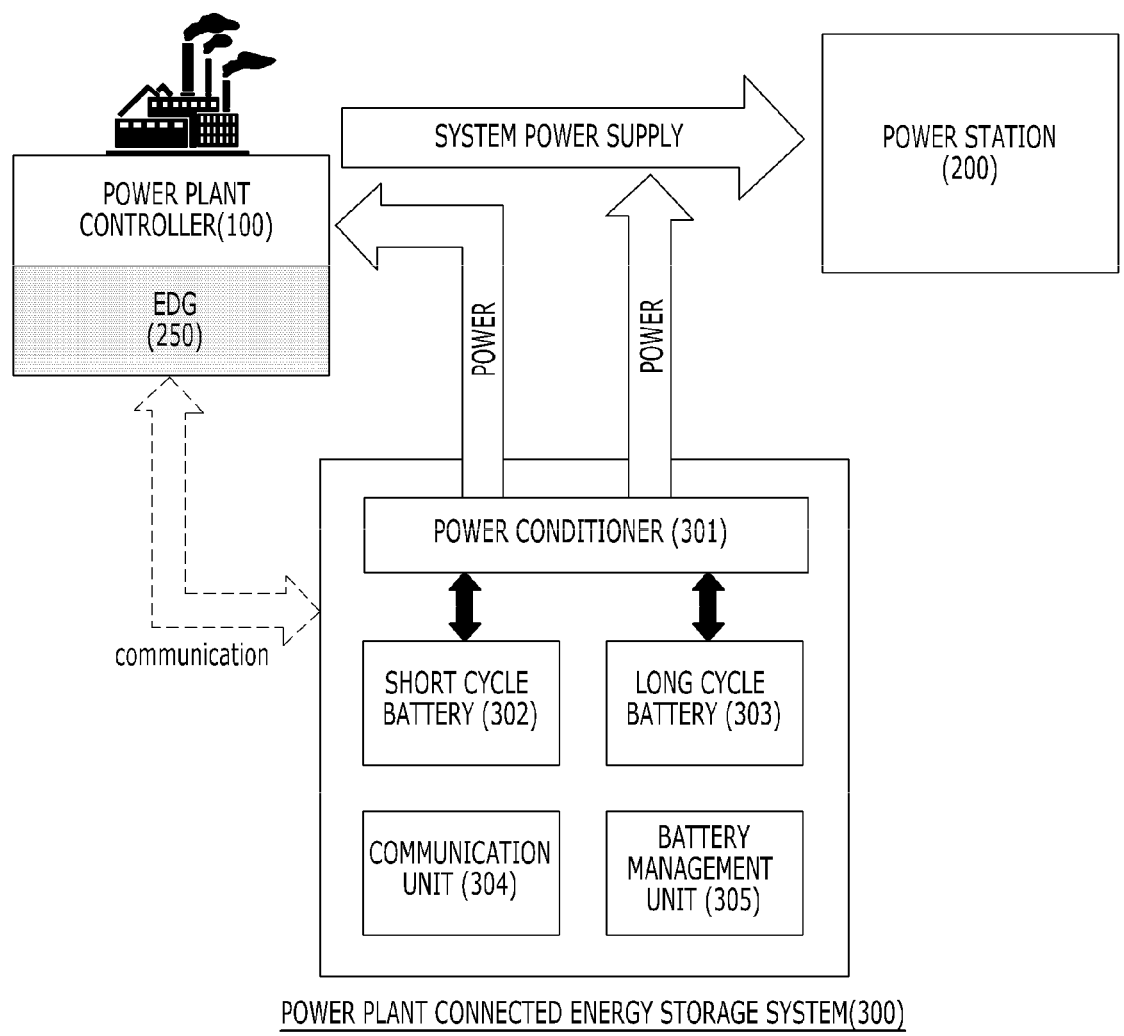
FIG. 11 is a block diagram of a power plant connected energy storage system according to a third embodiment of the present disclosure, in which a multi-purpose power plant connected energy storage system is connected to a power plant equipped with an emergency diesel generator.

FIG. 11 illustrates a power plant-connected energy storage system according to a third embodiment of the present disclosure. In the embodiment of FIG. 11, a power plant-associated energy storage system is added to an existing system in which a conventional emergency diesel generator 250 is provided in a power plant. When the power plant requires emergency power, both of the emergency diesel generator 250 which is a mechanical structure and the energy storage system which is an electric structure are used to supply the emergency power.

When the emergency diesel generator 250 and the power plant-connected energy storage system coexist, when it is determined that the power plant is abnormally operated, the normalization of the power plant can be achieved by driving at least one of the two preliminary means (the emergency diesel generator 250 and the power plant-connected energy storage system). For example, in the event in which the power plant abnormally operates, the emergency diesel generator 250 is primarily driven to supply emergency power. After that, when power is still insufficient, it is determined that emergency diesel generator 250 is not normally driven or the power amount output from the emergency diesel generator 250 is not sufficient. Therefore, in this case, the electric energy storage unit of the power plant-connected energy storage system is secondarily driven to quickly normalize the operation of the power plant. Alternatively, the electric energy storage unit of the power plant-connected energy storage system is primarily driven and then the emergency diesel generator 250 may be secondarily driven.

Figure 12:
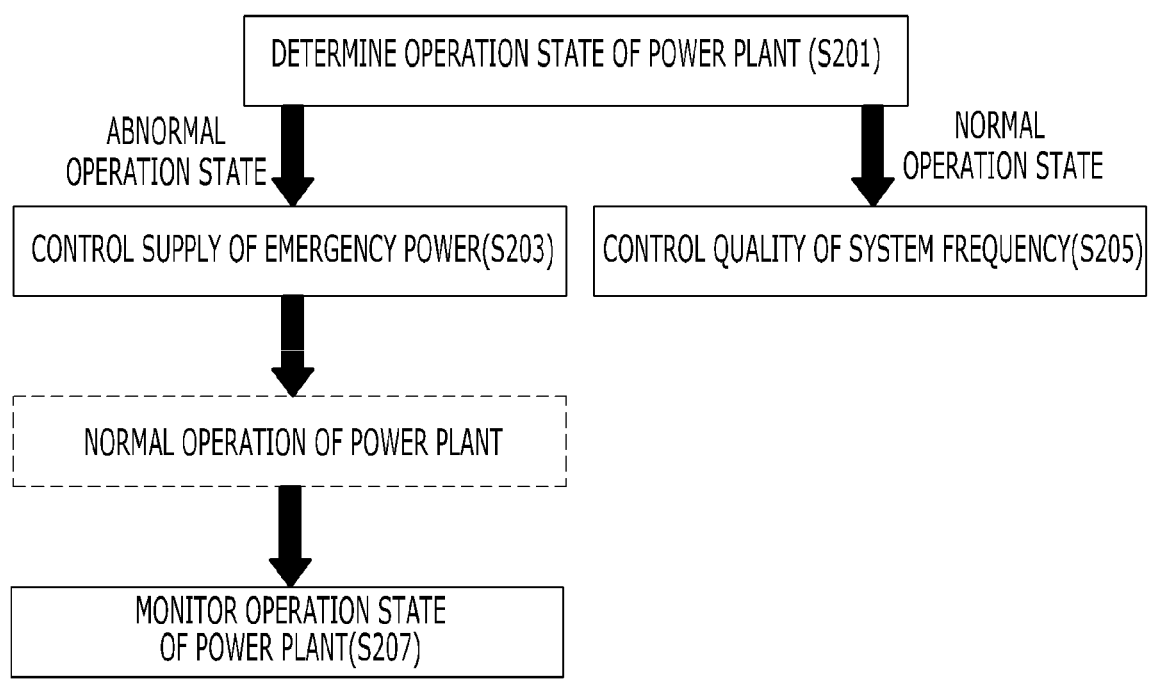
FIG. 12 is a flowchart of a method for controlling the power plant connected energy storage system according to the second embodiment of the present disclosure.

FIG. 12 illustrates a method for controlling the power plant-connected energy storage system according to the second embodiment.

According to FIG. 12, the control method starts with Step S201 in which a power conditioner of a power plant-connected energy storage system, such as that of FIG. 9, determines an operation state of a power plant. Although it is shown in FIG. 12 that the power conditioner performs this step, the present disclosure is not limited thereto. When another controller is provided in the power plant-connected energy storage system, Step S201 may be performed by this controller. This step is not limited to the specific method described above, and any method can be used if it is possible to determine whether the operation state of the power plant is normal or abnormal. However, the determination is preferably made on the basis of a control signal received from the power plant, data on the operation state of the power plant, and/or monitoring results of the operation of the power plant.

When it is determined that the operation state of the power plant is abnormal in Step S201, the power conditioner performs control such that at least one battery in the energy storage unit is discharged to supply emergency power to the power plant in Step S203. In this case, the batteries included in the energy storage unit may include a short cycle battery having a relatively short charge/discharge cycle and a long cycle battery having a relatively long charge/discharge cycle. Since this configuration is described above in detail, a duplicate description thereof will not be given.

On the other hand, when it is determined in Step S201 that the power plant is in a normal state, the power conditioner charges or discharges the batteries in the electric energy storage unit so that the power of the batteries can be used to maintain the frequency of the power output from the power plant within a preset range in Step S205. That is, the power of the batteries is used to control the quality of the system frequency.

After the power plant is restored to the normal operation state through Step S203, the power conditioner may continue to monitor the operation state of the power plant, and return to Step S201 to determine the operation state of the power plant.

Hereinabove, various exemplary embodiments of a power plant-connected energy storage system and a method of controlling the system have been described. The present disclosure is not limited to the above specific embodiments and applications, and various modifications can be made by those skilled in the art without departing from the gist of the present disclosure as defined in the claims. It is understood that these modifications fall within the scope of the technical spirit or concept of the present disclosure.

What is claimed is:

1. An energy storage system connected to a power plant supplying a power amount to a load, the energy storage system comprising:
   an electric energy storage unit that includes a short cycle battery having a relatively short charge/discharge cycle and a long cycle battery having a relatively long charge/discharge cycle and is configured to be charged or discharged to improve frequency quality of power output from the power plant; and
   a power conditioner configured to control the power output from the power plant and to control charge and discharge the short cycle battery and the long cycle battery in accordance with the control of the power output from the power plant,
   wherein the short cycle battery is used for charging or discharging more than the long cycle battery when variation of power demand at the load is higher than a reference value, and the long cycle battery is used for charging or discharging more than the short cycle battery when the variation of the power demand at the load is lower than the reference value, and
   wherein the reference value is determined based on whether the change of the frequency of the power output becomes relatively more rapid or sharper as the variation of the power demand becomes higher than the reference value.

2. The energy storage system according to claim 1, the power amount comprising:
   a first power amount output from the power plant, the first power amount being 95% to 105% of a maximum power amount of the power plant; and
   a second power amount output from at least one of the short cycle battery and the long cycle battery.

3. The energy storage system according to claim 1, wherein the electric energy storage unit is further configured to output the power amount that is one of a baseline power output from the long cycle battery, a peak power output from the short cycle battery, or the sum of the baseline power and the peak power.

4. The energy storage system according to claim 1, wherein the short cycle battery and the long cycle battery are configured to supply power to each other.

5. The energy storage system according to claim 1, wherein the power conditioner is further configured to
   operate in conjunction with a power plant controller provided in the power plant,
   receive data from the power plant, and
   control a charge or discharge of the short cycle battery and the long cycle battery on the basis of the received data.

6. The energy storage system according to claim 5, wherein the power conditioner is further configured to control the charge or discharge of the short cycle battery among the batteries included in the electric energy storage unit when the power plant controller performs governor free control or automatic power generation control.

7. The energy storage system according to claim 6, wherein, when the power plant controller performs frequency control following the governor free control or the automatic power generation control, the power conditioner is further configured to control the charge or discharge of the long cycle battery of the batteries included in the electric energy storage unit.

8. An energy storage system connected to a power plant supplying a power amount to a load, the energy storage system comprising:

an electric energy storage unit configured to be discharged to supply emergency power to a power plant; and a power conditioner configured to control charge or discharge of at least one battery included in the electric energy storage unit, wherein, when it is determined that the power plant needs to be supplied with external power, the power conditioner is further configured to supply emergency power to the power plant by discharging the at least one battery included in the electric energy storage unit, wherein the power plant is equipped with an emergency diesel generator, and wherein, when it is determined that the power plant needs to be supplied with external power, the power conditioner is further configured to discharge to the power plant the at least one battery selected from among a short cycle battery and a long cycle battery included in the electric energy storage unit according to an operation state of the emergency diesel generator, wherein the short cycle battery is used for discharging more than the long cycle battery when variation of power demand at the load is higher than a reference value, and the long cycle battery is used for discharging more than the short cycle battery when the variation of the power demand at the load is lower than the reference value, and wherein the reference value is determined based on whether the change of the frequency of the power output becomes relatively more rapid or sharper as the variation of the power demand becomes higher than the reference value.

9. The energy storage system according to claim 8, wherein, when it is determined that the power plant is in a normal operation state, the power conditioner is further configured to charge or discharge the at least one battery included in the electric energy storage unit to maintain a frequency of power output from the power plant within a preset range.

10. The energy storage system according to claim 8, wherein the power conditioner is further configured to monitor an amount of power output from the emergency diesel generator, and discharge at least one of the short cycle battery and the long cycle battery in the electric energy storage unit such that the sum of the power amount output from the emergency diesel generator and the power amount output from the electric energy storage unit is greater than or equal to a preset value.

11. The energy storage system according to claim 8, wherein the power plant is determined to need to be supplied with external power in one of an event of power outage, an event of restarting the power plant, or an event of commissioning the power plant.

12. The energy storage system according to claim 9, wherein, when the power plant is in the normal operation state, the power conditioner is further configured to control charge or discharge of the batteries included in the electric storage unit in conjunction with a power plant controller provided in the power plant.

13. A method for controlling a power plant-connected energy storage system supplying a power amount to a load, the method comprising:

(a) determining, by a power conditioner, an operation state of a power plant; and (b) performing, by the power conditioner, control such that emergency power is supplied to the power plant by discharging batteries included in an electric energy storage unit when it is determined that the power plant needs to be supplied with external power, wherein the power plant is equipped with an emergency diesel generator, and wherein, when it is determined in the step (b) that the power plant needs to be supplied with external power, the power conditioner discharges to the power plant at least one battery selected from among a short cycle battery and a long cycle battery included in the batteries according to an operation state of the emergency diesel generator, wherein the short cycle battery is used for discharging more than the long cycle battery when variation of power demand at the load is higher than a reference value, and the long cycle battery is used for discharging more than the short cycle battery when the variation of the power demand at the load is lower than the reference value, and wherein the reference value is determined based on whether the change of the frequency of the power output becomes relatively more rapid or sharper as the variation of the power demand becomes higher than the reference value.

14. The method according to claim 13, further comprising:

(c) charging or discharging, by the power conditioner, one or more batteries in the electric energy storage unit such that a frequency of power output from the power plant is maintained within a preset range when it is determined that the power plant is in a normal operation state.

* * * * *